United States Patent [19]

Owens

[11] Patent Number: 4,879,735

[45] Date of Patent: Nov. 7, 1989

[54] BAGGAGE INSPECTION CONVEYOR BAFFLE AND METHOD

[76] Inventor: Robert W. Owens, 1813 Westlake Ter., White Settlement, Tex. 76107

[21] Appl. No.: 200,247

[22] Filed: May 31, 1988

[51] Int. Cl.$^4$ .............................................. G21C 11/00
[52] U.S. Cl. ...................................... 378/57; 378/51; 250/359.1
[58] Field of Search ............................ 378/57, 58, 51; 250/358.1, 359.1, 360.1, 515.1

[56] References Cited

U.S. PATENT DOCUMENTS 3,678,278  7/1972  Peil .................................... 250/515.1
3,980,889  9/1976  Haas et al. .
4,020,346  4/1977  Dennis .
4,062,518  12/1977  Stivender et al. .
4,239,969  12/1980  Haas et al. .

Primary Examiner—Carolyn E. Fields
Assistant Examiner—Joseph A. Hynds

[57] ABSTRACT

An improved X-ray baggage inspection device having an input port with a baffle pivotally suspended from an upper edge to substantially occlude an upper selected region of the input port, leaving an open space adjacent to a baggage conveyor having a configuration suited for the passage of briefcase type baggage horizontally disposed upon the conveyor, but which will pivot inward in response to all types of baggage having a height exceeding a preselected distance between the conveyor and the lower edge of the baffle.

6 Claims, 1 Drawing Sheet

BAGGAGE INSPECTION CONVEYOR BAFFLE AND METHOD

BACKGROUND OF THE INVENTION

1. Field of the Invention

This invention relates generally to baggage inspection devices for the non-intrusive inspection of baggage, and specifically to airport X-ray carry-on baggage inspection devices.

2. Description of the Prior Art

Baggage inspection devices are used to inspect the contents of baggage in a non-intrusive fashion. The principle use of such non-intrusive devices is in airport security. The most common baggage inspection device is an X-ray carry-on baggage inspection device used at airport terminals.

Existing X-ray baggage inspection devices are generally adapted to inspect baggage horizontally disposed upon a conveyor. Baggage that is vertically disposed upon the conveyor cannot be properly inspected.

Most X-ray baggage inspection devices have an input port that is defined in part by a housing and in part by a conveyor. Ordinarily, the conveyor forms the lower boundary of the input port. Most input ports of X-ray baggage inspection devices are covered by a curtain comprising a plurality of strips of flexible material.

The input port curtains have one serious drawback in that they do not encourage the proper placement of baggage on the conveyor, since it is readily apparent that the input port curtain will yield to allow the passage of baggage that is either horizontally or vertically disposed upon the conveyor. Since baggage that is vertically disposed upon the conveyor cannot be properly inspected, the conveyor must be halted, and the baggage must be moved from the vertical position to the horizontal position to allow proper inspection. Alternately, an attendant must be present at the entry to assure that the baggage is properly placed on the conveyor.

Such interruptions in the operation of the inspection operation cause small time delays, which in the aggregate amount to substantial delays at airport terminals, where time if often of the essence. Additional personnel is costly, the action of changing the position of the baggage is an annoyance to the X-ray baggage inspection device operator.

SUMMARY OF THE INVENTION

The present invention encourages proper placement of baggage on a conveyor, but does not impede the conveyance of properly placed but over-sized carry-on baggage.

As an apparatus, the invention consists of an improvement in an X-ray baggage inspection device of the type disposed above a conveyor, and having an input port with an upper boundary and a lower boundary, with the lower boundary being defined by the conveyor. A substantially rigid baffle having an upper edge and a lower edge is pivotally suspended from the upper boundary of the housing by the upper edge. The baffle substantially occludes an upper selected region of the input port, with the lower edge spaced a preselected distance above the conveyor, leaving an open space adjacent to the conveyor having a configuration suited for the passage of briefcase type baggage horizontally disposed upon the conveyor. Baggage having a height less than the preselected distance between the lower edge of the baffle and the conveyor will pass through the open space into the baggage inspection device. Baggage that has a height exceeding the preselected distance will cause the baffle to pivot inward.

The present invention encourages the proper placement of baggage on the conveyor. Specifically, the baffle gives the appearance of a plate that is fixedly mounted to the upper region of the input port, preventing the passage of baggage vertically disposed upon the conveyor. The open space at the lower region of the input port is adapted in size and shape to suggest that the baggage be horizontally disposed upon the conveyor in order to pass into the baggage inspection device. If horizontally disposed baggage has a height exceeding the height of the opening, the baffle will pivot inward allowing such baggage to enter the baggage inspection device.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
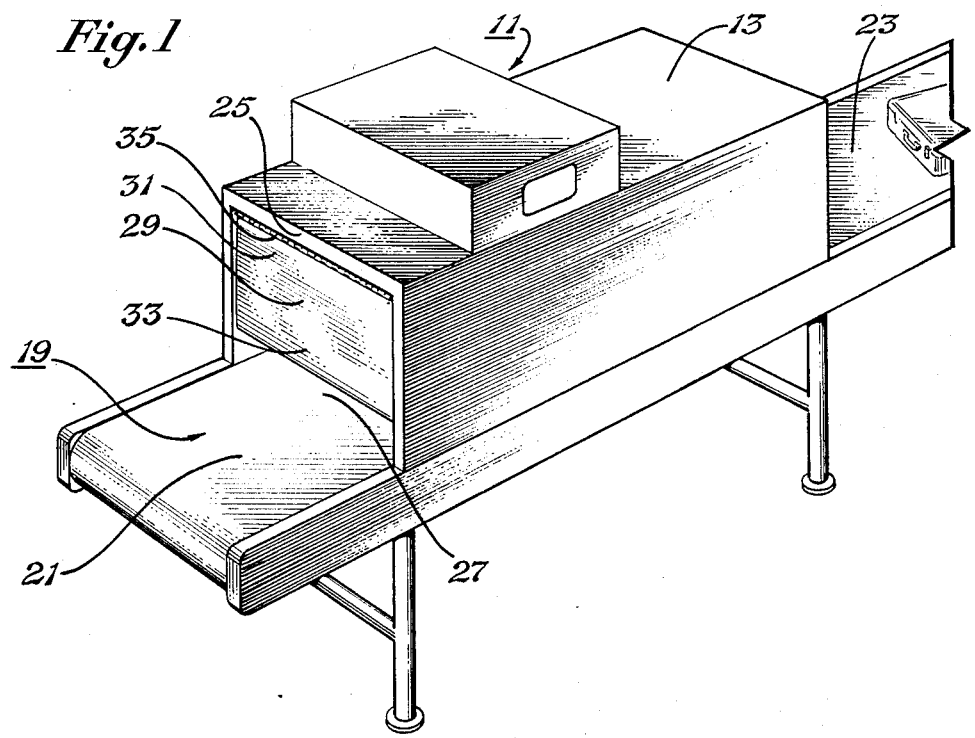
FIG. 1 is a perspective view of the improved X-ray baggage inspection device of the present invention.

FIG. 1 is a perspective view of an improved baggage inspection device of the present invention. An X-ray baggage inspection device 11 consists of a housing 13 having an input port 15 (FIG. 2) and an output port 17 (FIG. 2), disposed above a Conveyor 19, having a first location 21 and a second location 23 for transporting baggage between the first location 21 and the second location 23.

In one preferred embodiment, the input port 15 has an upper boundary 25 defined by housing 13, and a lower boundary 27 defined by conveyor 19. A substantially rigid baffle 29, having an upper edge 31 and a lower edge 33, is pivotally suspended from upper boundary 25 of housing 13 at upper edge 31. Baffle 29 comprises a substantially flat monolithic rectangular plate that is pivotally suspended from upper boundary 25 by a hinge 35.

Baffle 29 substantially occludes an upper selected region 37 of input port 15. Lower edge 33 of baffle 29 is spaced a preselected distance above conveyor 19, leaving an open space adjacent to conveyor 19 that is identified in FIG. 2 as lower selected region 39. Lower selected region 39 has a configuration suited for the passage of briefcase type baggage horizontally disposed upon said conveyor 19 beneath lower edge 33 of baffle 29.

Briefcase type baggage is baggage of the type having a vertical height that is much greater than its width, often used for the transportation of papers, clothing, books, and personal effects. The definition of briefcase type baggage is broad enough to include briefcases, purses, clutches, and other small pieces of luggage referred to in the industry as "carry-on luggage". The width of baggage horizontally disposed upon Conveyor 19 is referred to hereinafter as the "horizontal height" of the baggage.

Since baffle 19 is pivotally suspended from upper boundary 25, it will pivot inward in response to the passage of baggage having a horizontal height exceeding the preselected distance between lower boundary 27 and lower edge 33 of baffle 29. During normal operation, baffle 19 is pivotally suspended from upper boundary 25 in a position substantially normal relative to conveyor 19; as oversize horizontally disposed baggage or vertically disposed baggage is advanced along conveyor 19, baffle 29 will be urged into an angular position relative to conveyor 19.

Figure 2:
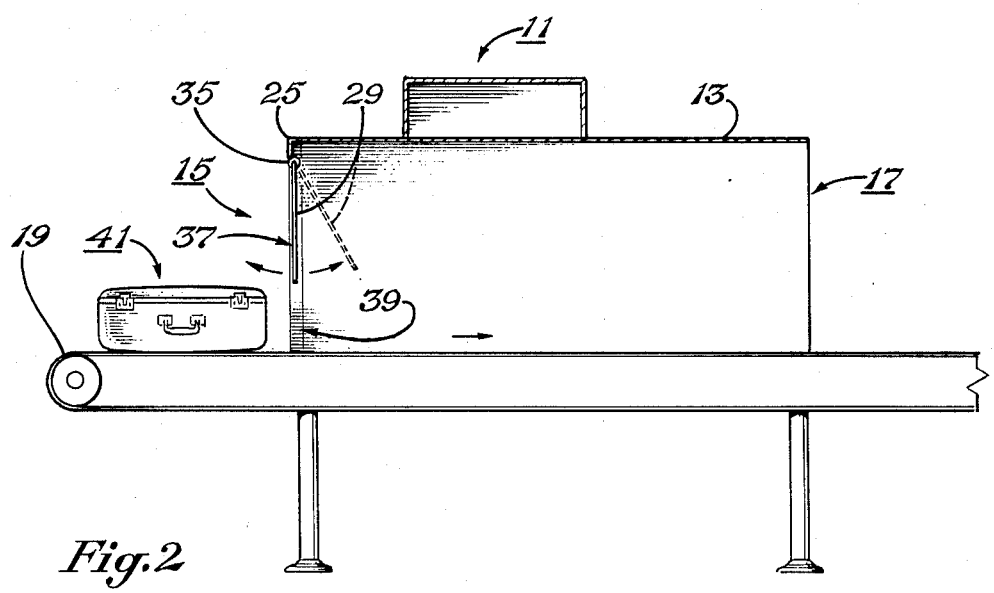
FIG. 2 is a longitudinal section view of the X-ray baggage inspection device of FIG. 1.

FIG. 2 is a longitudinal section of the improved X-ray baggage inspection device of FIG. 1. Briefcase type baggage 41 is horizontally disposed upon conveyor 19 at first location 21 for transportation through housing 13 to output port 17, wherein X-ray baggage inspection device 11 serves to non-intrusively inspect the content of briefcase type baggage 41. Specifically, X-ray baggage inspection device 11 is utilized to inspect for firearms or explosives.

Baffle 29 is shown suspended from upper boundary 25 in a position substantially normal relative to conveyor 19, but is depicted in phantom at an angular position relative to conveyor 19.

Baffle 29 serves to encourage the horizontal placement of baggage on conveyor 19. A traveler approaching the X-ray baggage inspection device 11 will assume that baffle 29 is rigidly mounted in selected upper region 37 of input port 15, preventing the vertical placement of baggage. In addition, the traveler will recognize that selected lower region 34 has a configuration suited for the passage of briefcase type baggage horizontally disposed upon conveyor 19.

Since baffle 29 is pivotally suspended from upper boundary 25, it will pivot inward in response to briefcase type baggage 41 having a horizontal height exceeding the preselected distance between conveyor 19 and lower edge 33 of baffle 29. In addition, baffle 29 will pivot inward in response to briefcase type baggage 41 vertically disposed upon conveyor 19. Baffle 29 will pivot inward to oversize baggage horizontally disposed on conveyor 19. "Oversize" baggage is considered herein to refer to baggage that will fit through input port 15, but which when horizontally disposed on conveyor 19, has a height greater than the lower region 39.

In one preferred embodiment, the preselected distance between conveyor 19 and lower edge 33 of baffle 29 is approximately eight inches, which provides an opening height sufficient to accommodate substantially all briefcase type baggage.

The present invention presents a variety of advantages over existing systems. First, the baffle encourages the proper placement of briefcase type baggage on the X-ray baggage inspection device conveyor. This allows the most thorough non-intrusive inspection of carry-on baggage. In addition, carry-on baggage that has a horizontal height that exceeds the preselected between the baffle and the conveyor surface may still pass unimpeded through the X-ray baggage inspection device, since the baffle will pivot inward in response to the conveyance of the baggage. Thus, the improper placement of baggage is discouraged, while baggage having a variety of configurations are passed through the X-ray baggage inspection device without impediment. The present invention saves a considerable amount of time at airport terminals, where improperly placed carry-on baggage impedes the flow of passengers and baggage through a terminal security station. In addition, the distraction and annoyance often associated with improperly positioned carry-on baggage is eliminated, allowing the X-ray baggage inspection device operator to focus his or her attention upon the task of detecting weapons and explosives.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. In an x-ray baggage inspection device including a means for non-intrusive inspection of baggage and a housing disposed above a conveyor, said housing having an input port with an upper boundary and a lower boundary, said lower boundary defined by said conveyor, wherein said conveyor transports baggage through said housing from said input port to an exit port, the improvement comprising:

a substantially rigid baffle having an upper edge and a lower edge, said baffle being pivotally suspended from said upper boundary of said housing at said upper edge, substantially occluding an upper selected region of said input port, said lower edge being spaced a preselected distance above said conveyor, leaving an open space adjacent to said conveyor having a configuration suited for the passage beneath said lower edge of briefcase type baggage horizontally disposed upon said conveyor, wherein said substantially rigid baffle pivots inward in response to oversize baggage having a height exceeding said preselected distance between said conveyor and said lower edge of said baffle when horizontally disposed on said conveyor.

2. An apparatus according to claim wherein said upper edge of said baffle is pivotally suspended from said upper boundary by a hinge.

3. An apparatus according to claim 1 wherein said baffle is pivotally suspended from said upper boundary in a position substantially normal relative to said conveyor, but movable into an angular position relative to said conveyor in response to baggage having a height exceeding said preselected distance between said conveyor and said lower edge of said baffle.

4. An apparatus according to claim 1 wherein said baffle comprises a substantially flat monolithic rectangular plate.

5. An improved baggage inspection device, comprising in combination:

conveyor means for transporting baggage from a first location to a second location;

a housing disposed above said conveyor means having an input port proximal to said first location and an output port proximal to said output port, each having an upper boundary defined by said housing and a lower boundary defined by said conveyor means;

means for non-intrusive inspection of said baggage horizontally disposed upon said conveyor means;

a substantially rigid planar baffle pivotally suspended from said upper boundary of said input port for substantially covering an upper selected region of said input port leaving a lower selected region of said input port proximal to said conveyor means uncovered, providing a clearance between said baffle and said conveyor means of substantially at least eight inches vertical height, wherein said lower selected region of said input port accomodates the passage of briefcase type baggage only when horizontally disposed upon said conveyor means, and wherein said substantially rigid planar baffle pivots to allow the passage of oversize baggage having a horizontal height exceeding said clearance.

6. A method of inspecting baggage with an x-ray baggage inspection device having an input port with an upper boundary disposed above a baggage conveyor, said conveyor substantially defining a lower boundary of said input port, comprising the steps of:

pivotally mounting a substantially planar rigid baffle to the upper boundary, the baffle having a lower edge disposed a selected distance above the conveyor, the selected distance being sufficient to accomodate briefcase type baggage horizontally disposed on said conveyor, but not briefcase type baggage vertically disposed;

placing briefcase type baggage on said conveyor in a horizontal position and passing said briefcase type baggage beneath said baffle with said conveyor;

placing oversize baggage on said conveyor in a horizontal position, said baggage having a height, measured when horizontally disposed, that is greater than said selected distance, and moving said oversize baggage into contact with said baffle, pivoting said baffle with said oversize baggage, and passing said oversize baggage through said x-ray baggage inspection device; and non-intrusively inspecting both briefcase type baggage and oversize baggage passed through the baggage inspection device on said baggage conveyor.

* * * * *